United States Patent

Muller

[15] 3,688,195

[45] Aug. 29, 1972

[54] NORMALLY SILENT MOBILE RADIO TELEPHONE SYSTEM

[72] Inventor: Jean Jacques Muller, Garches, France

[73] Assignee: International Standard Electric Corporation, New York, N.Y.

[22] Filed: Jan. 6, 1970

[21] Appl. No.: 861

[30] Foreign Application Priority Data

Jan. 30, 1969 France....................6901959

[52] U.S. Cl.....................325/55, 179/41 A, 325/51, 343/177

[51] Int. Cl...........................................H04b 1/38

[58] Field of Search...325/55, 64, 57, 54; 179/15 BZ, 179/41 A; 343/175, 177

[56] References Cited

UNITED STATES PATENTS

| | | | |
|---|---|---|---|
| 2,722,598 | 11/1955 | McDonald | 343/177 X |
| 2,803,744 | 8/1957 | Berger et al. | 343/177 X |
| 3,173,996 | 3/1965 | Rypinski, Jr. | 325/55 X |
| 3,268,664 | 8/1966 | Fleissner et al. | 179/15 BZ |

*Primary Examiner*—Benedict V. Safourek
*Attorney*—C. Cornell Remsen, Jr., Walter J. Baum, Percy P. Lantzy, J. Warren Whitesel, Delbert p. Warner and James B. Raden

[57] ABSTRACT

A mobile radio telephone system is provided in which a "radio hush" condition prevails as long as there is no call or current conversation. The mobile sets are tuned in a standby position to a fixed channel which is only transmitted by the fixed station when there is a selectro call to send out for a terminating call. The station is a standby position is also tuned to a fixed channel (the same, or another one) which is only transmitted by a mobile set starting an originating call. Only a channel-request transmits a free conversation channel marked with an offer tone, and the calling set tunes to this channel for signalling and operation, as usually provided for originating calls.

4 Claims, 2 Drawing Figures

Figure 1:
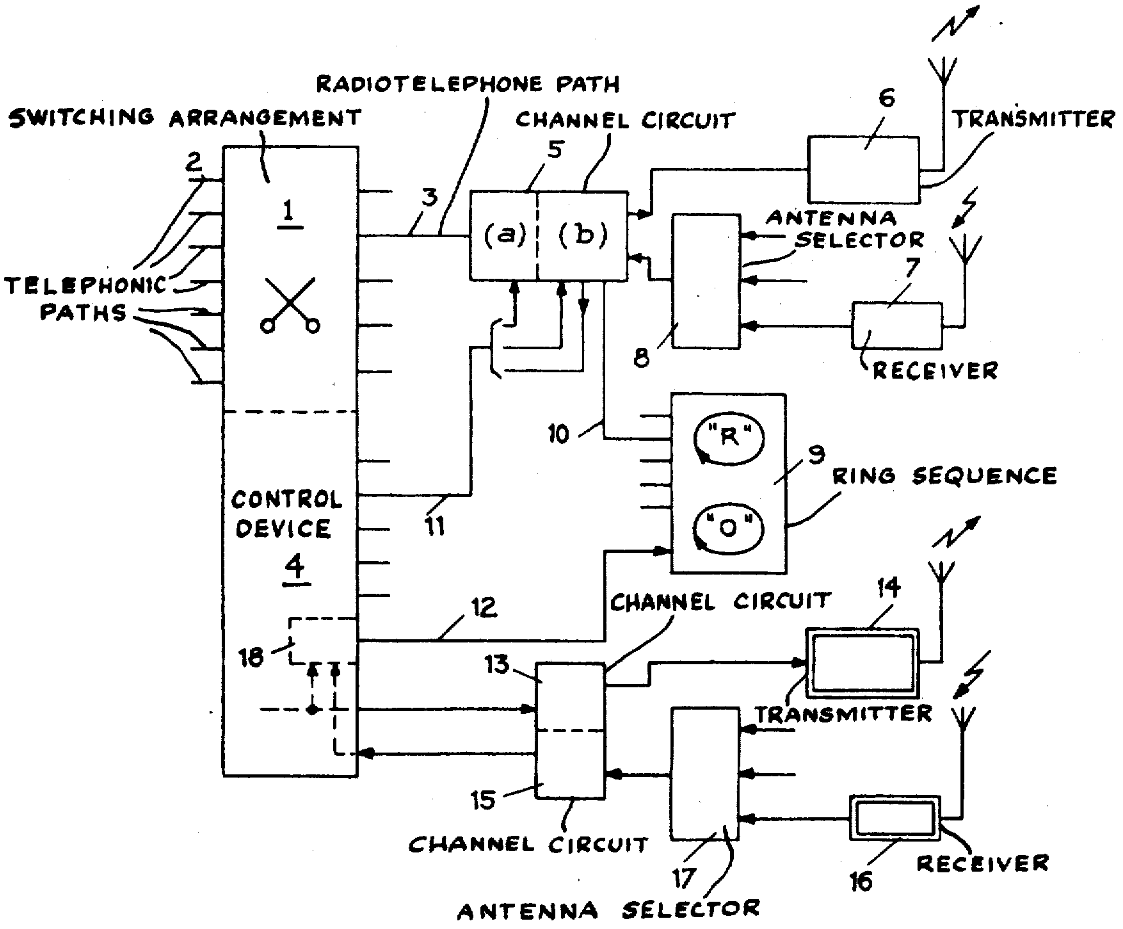

*Inventor*
JEAN JACQUES MULLER
By D. O. Warner
*Attorney*

NORMALLY SILENT MOBILE RADIO TELEPHONE SYSTEM

The present invention relates to mobile radio communication systems which allow a fixed station to communicate with apparatus mounted as on vehicles. selecto In French Pat. No. 1,540,400 filed June 16, 1967 corresponding to U.S. Pat. application No. 737,963, filed June 18, 1968 in the same name as the present, there is described a mobile radio communication system in which a fixed channel is assigned to terminating selection calls that are transmitted from the station, while a free channel, selected by the station out of a group of conversation channels, is marked with a tone so as to be taken by a mobile set which replies to a call for its number, or which lifts for making an originating call. In a preferred modification, one free channel is marked with a tone for being taken by a mobile set which replies to a call for its number, while another free channel is marked with another tone for being taken by a mobile set which lifts for making an originating call. The fixed selecto call channel needs not be marked with a characteristic tone because the mobile sets tune themselves to this channel when they are in a stand by position. The radio carrier of this channel neither needs not be transmitted continuously : the station may transmit it only when there is a selecto call to be cast. The reply channel, -in case it is distinct from the channel which is offered to the originating calls,- may also be transmitted only when there is a terminating call for a mobile set. The carrier of this channel is transmitted then together with its tone, so that the called set could find it. On the contrary, the offering channel must be transmitted continuously (carrier and tone) so that a calling mobile set could find it. In the modification wherein one and the same marked channel can be taken by a mobile set, either for replying to a terminating call or for making an originating call, this channel must be continuously transmitted (carrier and tone) to ensure the originating call service.

However, military mobile radio links prescribe a condition of "radio hush" : no radio carrier should be transmitted as long as there is no call or current conversation. There is no difficulty to comply with this condition for the fixed selecto call channel, and also for the reply channel where another channel is offered to originating calls. On the contrary, this condition cannot be met, in the system according to the above mentioned patent, for the channel which must be taken for an originating call : the carrier for this channel must be transmitted continuously, together with its marking, in order that a mobile set can find it at any time.

An object of the present invention is to modify the said system in such a way that a channel which must be taken for an originating call needs not be transmitted beforehand, so as to obtain a system which would entirely comply with the "radio hush" condition. According to a feature of this invention, the signalling provided for engaging an originating call comprises a first signal ("channel-request signal") which is transmitted by a calling set on a fixed channel, and the carrier of the channel which will be offered to this originating call is transmitted, together with its tone, only in response to the said first channel. The following course of operation can be the same as in the above mentioned patent : the calling set leaves the said fixed channel to turn to the marked channel transmitted by the station and sends a seizure signal on that channel ; the station stops marking that channel and so on.

In a first modification, the system comprises a single fixed channel, operating in both directions, for the selecto calls and the channel-request signals. In this modification, the system according to the invention preferably comprises, in a manner known per se, a single free channel which will be transmitted from the station, together with its marking, either after a selecto call, for being taken by the called set, or after the said channel request signal, for being taken by a calling set.

In a second modification, the system according to the invention comprises two fixed channels, the one for the selecto calls and the other for the said channel-request signals. In this modification, the system preferably comprises, in a manner known per se, two free channels marked with different tones, viz. a channel which will be transmitted from the station, together with its reply tone, after a selecto call, for being taken by the called set, and another channel which will be transmitted from the station, together with its offer marking, after a channel-request signal, for being taken by the calling set. In this second modification, the mobile sets are arranged in such a way that a set which lifts in order to make an originating call first leaves the fixed selecto-call channel (on which it was tuned in its stand by position) for turning to the fixed channel-request signal channel, then sends out its channel-request signal on this second fixed channel, and then searches the offer tone on a free channel to take that channel for the following course of operation. In this modification, no interference is possible, after a selecto call, between the called set which will turn to the reply-marked channel, and a calling set, which will turn to the offer-marked channel. It will be assumed that, in a known manner, originating calls will be inhibited in the mobile sets during each selecto call, and that the station will stop at once marking a free channel when it will receive the seizure signal sent out by a mobile set (either calling or called, as the case may be).

Figure 2:
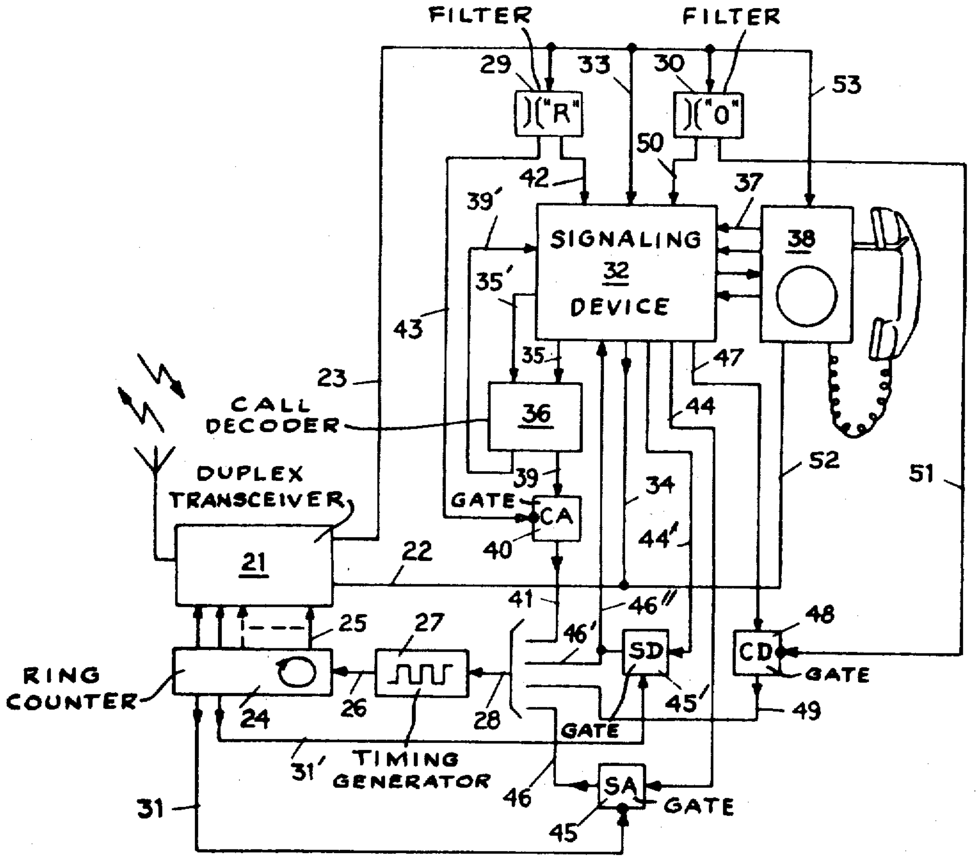

The objects and features of the present invention will appear more clearly from the following description of an embodiment in the modification which comprises two fixed channels (selecto calls and channel requests) and two roving free channels (replies to selecto calls and originating calls) ; the said description being made in relation with the appended drawing, in which :

FIG. 1 is a block diagram of the arrangement in the radio telephone station in the said embodiment, and FIG. 2 is a block diagram of a corresponding outfit in a mobile set.

Referring to FIG. 1, 1 designates a switching arrangement adapted to connect telephonic paths 2 (which will be connected anyway to the stationary users) to radiotelephonic paths 3 each of which carries a radiotelephonic conversation channel. Switching arrangement 1 is associated with a control device 4 which may be either manual or automatic (a marker). Each path 3 carries a channel circuit 5 having its one side (*a*) fit out in accordance to the telephonic system used, while its other side (*b*) is fit out for cooperation with a radiotelephonic transmitter 6 and a radiotelephonic receiver 7. In the drawing, a plurality of receivers 7 are provided for a space diversity operation controlled by an antenna selector 8. A ring sequence device 9 connected to each channel circuit 5 by a link 10 designates a free channel to be used for the reply to a terminating call (sequence ring "R") and that to be used for an originating call (sequence ring "O"). Control device 4 is connected to each channel circuit 5 by a link 11 and to the ring sequence device by a link 12. The details of these devices, outfits and links, is known in the art.

For transmitting selecto calls, control device 4 is connected to a channel circuit 13 which in turn is connected to a radio telegraphic transmitter 14. Lastly, for receiving the channel-request signals according to the invention, device 4 is connected to a channel circuit 15 which in turn is connected to a radiotelegraphic receiver 16. In the drawing, a plurality of receivers 16 are provided for a space-diversity operation controlled by an antenna selector 17. In control device 4, a device 18 which is operating when a selecto call is transmitted sends an order to ring sequence device 9 (ring "R") for causing this device to transmit a radio carrier, marked with the reply tone "R," on the free channel which has been designated by this device. Device 18 also operates in response to a channel-request signal (coming from channel circuit 15) to send to ring sequence device 9 (ring "O") an order for causing this device to transmit a radio carrier, marked with the offer tune "O," on the free channel which has been designed by this device. Each time, control device 4 is informed through links 11, which channel is put in service for a terminating call or for an originating call, and it controls switching arrangement 1 in a way to connect a path 2 to that path 3 which is connected to that channel. It will be understood that the way of carrying out these control or information devices and links resorts to the artsman's skill.

The mobile set represented in FIG. 2 comprises a duplex transceiver 21 connected to a transmission bus 22 and a reception bus 23. This transceiver is tuned to a channel or another by means of a ring counter 24 the outlets 25 of which are connected, in the transceiver to quartz filters, after a well-known technique. Inlet 26 of counter 24 is connected to a timing generator 27 which yields e.g. 5 pulses in a second, so as to let the transceiver dwell about 0.2 second on each channel during the search for a tone. Timing generator 27 runs when a control marking is applied to its inlet 28. The transceiver's being tuned to the channel which carries the tone searched for is stated by filters branched on the reception bus 23 : filter 29 for the "R"-tone and filter 30 for the "O"-tone. The transceiver's being tuned to the fixed channels provided for the selecto calls and the channel requests is stated by counter 24 itself, which delivers a signal at its outlet 31 when it tunes the transceiver to the call channel (for a terminating call) or at its outlet 31' when it tunes the transceiver to the channel-request channel (for an originating call).

Free mobile sets are in a standby position on the call channel. A signalling device 32 is connected between the reception bus (connection 33) and the transmission bus (connection 34). An outlet 35 of signalling device 32 is connected to a selecto call decoder 36. Usual connections 37 connect the signalling device to the telephone set 38.

Signalling device 32 receives all terminating calls transmitted on the call channel, giving them no other response than in preventing an originating call to be made during the reception of a selecto call. However, when a terminating call is aimed at the set considered, decoder 36 states such a call and delivers a signal at its outlet 39 which is connected to a gate device 40 (CA). Outlet 41 from this gate device applies then a marking to inlet 28 of timing generator 27 which is thus started. Counter 24 progresses step by step, and transceiver 21 passes from a channel to another so as to find that which is marked with the "R"-tone.

The station (FIG. 1) transmits the carrier of a free channel with the "R"-tone, each time it casts a selecto-call. When transceiver 21 (FIG. 2) reaches the channel which carries tone "R," filter 29 transmits this tone (or a signal) to signalling device 32 from its outlet 42, at the same time inhibiting gate device 40 from its outlet 43. Gate device 40 stops marking its outlet 41 toward timing generator 27. The latter stops and lets the transceiver dwell on the channel which carries tone "R." The programme of the signals and operation in the fixed station and the mobile set progresses then after chart I hereunder (part "Terminating communications").

CHART I

A fixed channel for the selecto calls another fixed channel for the originating-channel requests a marked channel for answers of called sets an otherwise marked channel to be offered to calling sets

| The station programme | | The Mobile Set programme |
|---|---|---|
| | Terminating communications | |
| Selecto call on fixed channel I | → | |
| | | Locking originating calls<br>Decoding the selecto call |
| Casting a channel marked "R" | → | |
| | | Searching the "R"-channel |
| | ← | Acknowledging of receipt $T_1$ |
| Stopping tone "R"<br>Connection<br>Ringing | → | |
| | | Ringing<br>Lifting the handset |
| | ← | Signal $T_2$ |
| Ringing stopped<br>Through-connection | | |
| | . . . Conversation . . . | |
| | | Hanging up |
| | ← | Signal $T_3$ |
| Release | | Homing to fixed channel I (stand by) |
| | Originating communications | |
| | | Lifting the handset<br>Turning to fixed channel II |
| | ← | Request signal $T_1$ |
| Casting a channel marked "0" | → | |
| | | Searching the "0"-channel |
| | ← | Seizure signal, first item $T_1$ |
| Stopping tone "0" | | |
| | ← | $d^0$, following items $T_2$, $T_1$ |
| | ← | Identity code keyed on $T_1/T_2$ |
| Return of identity code | → | |
| | ← | Acknowledgment of receipt $T_1$ |
| Switching<br>Register tone | → | |
| | ← | Wanted number keyed on $T_1/T_2$ |
| Switching<br>. . . . .<br>Through-connection | | |
| | . . . Conversation | |
| | | Hanging up |
| | ← | Signal $T_3$ |
| Release | | Homing to fixed channel I (standby) |

Responsive to the signal from filter 29 (connection 42), signalling device 32 sends an acknowledgement of receipt (tone $T_1$) through its outlet 34 and transmission bus 22. This acknowledgement of receipt will be the seizure signal. Responsive to this signal, the station stops marking "R," prepares the connection and then sends the ringing signal to the mobile set. Signalling device 32 receives the ringing signal through reception bus 23 and connection 33 and transmits it to the telephone 38, which rings or operates a sight indicator. When the user lifts the handset, signalling device 32 sends back a lift signal (tone $T_2$) through connection 34 and transmission bus 22. Responsive to this signal, the station stops ringing and makes up a connection between the stationary calling user end the engaged radio-telephonic channel. Conversation can take place. When the mobile set hangs up after conversation, signalling device 32 sends a hang-up signal (tone $T_3$). Responsive to this signal, the station carries out the release operations. In the mobile set, signalling device 32 delivers a signal at its outlet 44 which is connected to a gate device 45 (SA). This gate device sets a marking at its outlet 46 which is connected to timing generator 27. Said generator starts, and transceiver 21 passes from a channel to another. When counter 24 reaches the fixed selecto call channel, it sends a signal from its outlet 31 which is connected to an inhibit inlet of gate device 45. This gate device stops marking at its outlet 46, timing generator 27 and counter 24 stop, and the set dwells in a standby position on the fixed selecto call channel.

Operation in case of an originating call will be now described, further stating some elements of the mobile set, and referring to the same chart I (part "Originating communications"). It will be still remembered that this operation will be locked or inhibited anywise during reception of each selecto call.

In order to make an originating call, the user of the mobile set lifts the handsets. Signalling device 32, which is in the standby position, answers to lifting in transmitting a signal from its outlet 44' connected to a gate device 45' (SD). This gate device applies a marking at its outlet 46' which is connected to timing generator 27. Said generator starts and causes counter 24 to step forward. Counter 24 leaves its position on the fixed selecto call channel and takes one step forward. It may be assumed that on its next position, it tunes the transceiver 21 to the fixed channel-request channel. In this position, it applies a signal to its outlet 31' which is connected to an inhibit inlet of gate device 45'. This gate device stops marking its outlet 46', and timing generator 27 stops. A branch 46" of the outlet 46' is connected to signalling device 32. This device states that the marking is off this branch 46" and sends a lift signal, through connection 34 and transmission bus 22, on the fixed channel-request channel (tone $T_1$ on this fixed channel). The station answers this signal in transmitting the carrier of a free channel, marked with the tone "0." After the lift signal, signalling device 32 sends a signal through its outlet 47 which is connected to a gate device 48 (CE). This gate device applies a marking to its outlet 49 which is connected to timing generator 27. The said generator 27 starts again and causes counter 24 to step forward. When transceiver 21 reaches the channel which bears the "0"-tone, filter 30 through its outlet 50 transmits this tone (or a signal) to signalling device 32 while through its outlet 51 it locks the gate device 48. Gate device 48 removes the marking from its outlet 49 toward timing generator 27. The latter stops and lets the transceiver dwell on the channel which bears the "0"-tone.

Responsive to the signal from filter 30 (connection 50), signalling device 32 sends a seizure signal (tone $T_1$, then $T_2$, then again $T_1$) through its outlet 34 and transmission bus 22. Responsive to the first bit of this signal (the first tone $T_1$), the station removes the marking "0" from the engaged channel, whereby the latter is busied. When the signalling device states the "0"-tone departs at the moment the said device sends the first "$T_1$"-tone, it can be assumed that the mobile set considered has taken the channel for its originating call. Therefore the signalling device completes its seizure signal and then sends its identity code (keyed on tones $T_1$ and $T_2$) through connection 34 and transmission bus 22. Answering this identity code, the station sends back the same code. Signalling device 32 receives then its own identity code through reception bus 23 and connection 33. It transmits this code, through its outlet 35', to decoder 36. When the decoder knows the identity code of the set considered (which it has received through connection 35'), it sends through its outlet 39' a signal to signalling device 32. The signalling device sends then an acknowledgement of receipt (tone $T_1$) to the station through connection 34 and transmission bus 22. Responsive to this acknowledgement of receipt, control device 4 in the station (FIG. 1) causes the switching arrangement 1 to connect the radiotelephonic path 3 that has been engaged, to a register. The engaged register sends its dialling tone to the mobile set through that path 3.

In the mobile set (FIG. 2), the telephone 38 is connected to buses 22 and 23 by connections 52 and 53. The user of the mobile set hears the dialling tone and dials the number he wants on the telephone. The signalling device transmits this number (keyed on tones $T_1$ and $T_2$) through outlet 34 and transmission bus 22. Then the station carries out a connection with the wanted stationary set, rings this set and makes up a through-connection between the two sets after the fixed set has lifted, in the way usual in telephony. The conversation can take place. Hanging up the mobile set after conversation causes the operation described above for the case of a terminating call, and the mobile set resumes the stand by position, with transceiver 21 tuned to the fixed selecto-call channel.

In case the system according to the invention is carried out as that modification which comprises a single fixed channel which is used both for the selecto calls and the channel-request signals, and which casts a single free channel which is marked with a tone ("0") for an answer to a terminating call as well as an originating call, the programme of the signals and operation in the fixed station and the mobile set progresses after the chart II hereunder.

CHART II

A fixed channel for the selecto call and the originating channel requests a marked channel for the answer of the called sets and the offer to the calling set

| The station programme | The mobile Set programme |
|---|---|

| | | |
|---|---|---|
| | | **Terminating communications** |
| Selecto call on the fixed channel | → | |
| | | Locking originating calls |
| | | Decoding the selecto call |
| Casting a channel marked "0" | → | |
| | | Searching the "0"-channel |
| | ← | Seizure signal, first bit $T_1$ |
| Stopping the "O"-tone | | |
| | ← | d*, following bits $T_2$, $T_1$ |
| | ← | Identity code keyed on $T_1/T_2$ |
| Connection | | |
| Ringing | → | |
| | | Ringing |
| | ← | Lifting the handset |
| Ringing stopped | | |
| Through-connection | | |
| | | . . . Conversation. . . |
| | | Hanging up |
| | ← | Signal $T_3$ |
| Release | | Back to the fixed channel(standby) |
| | | **Originating communications** |
| | | Lifting the handset |
| | ← | Request signal $T_1$ |
| Casting a channel marked "0" | → | |
| | | Searching the "0"-channel |
| | ← | Seizure signal, first bit $T_1$ |
| Stopping the "0"-tone | | |
| ← d*, following bits $T_2$, $T_1$ | | |
| | ← | Identity code keyed on $T_1/T_2$ |
| Returning the identity code | → | |
| | ← | Acknowledgement of receipts $T_1$ |
| Switching | | |
| Register dialling tone | → | |
| | ← | Wanted number keyed on $T_1/T_2$ |
| Switching | | |
| . . . . . | | |
| Through-connection | | |
| | | . . . Conversation . . . |
| | | Hanging up |
| | ← | Signal $T_3$ |
| Release | | Back to fixed channel (standby) |

It is deemed that after the description of the modification of the system which is shown in the drawings, and with reference to the specification of the aforementioned French Pat. No. 1,540,400, and U.S. application Ser. No. 737,963 this chart II will be adequate for the artsman to carry out the modification concerned therein, and also any further modification (e.g. one which would comprise two fixed channels but a single free channel marked with an offer tone for the terminating calls as well as the originating calls).

It should be understood that the present invention is not strictly limited to the examples of manufacture which have been described and which are illustrated by the attached drawings, but also includes all those based on the same idea and which are established on the same principal.

I claim:

1. A system for mobile radiotelephone communications employing a radio silence condition, comprising a fixed station for transmitting originating calls over a normally silent fixed radio channel, a plurality of mobile radiotelephone sets, said mobile radiotelephone sets each including means for receiving calls over the fixed radio channel originating from the fixed station, each mobile station including means for seizing calls addressed to it, the mobile radiotelephone sets each including means for providing a call in the form of a channel request signal at the frequency of the fixed radio channel, the fixed station including means responsive to a channel request signal for transmitting a radio carrier signal marked with an offer tone on said fixed radio channel, the calling mobile sets each including means for seizing said fixed channel marked by offer tone to complete a connection for signalling and operation, and means for further controlling the transmission of carrier signals over said fixed radio channel, said means for further controlling the transmission including means limiting such transmission to periods coinciding with the duration of calls through said system, whereby said system maintains a "radio silence" when there are no calls or current conversations.

2. A system according to claim 1, in which the originating call from the fixed station includes a carrier signal marked with an offer tone which is transmitted by the fixed station on a single free channel to be taken by the called mobile set.

3. A system according to claim 1, in which means are included for handling two assigned fixed channels, one fixed channel is dedicated for originating calls from the fixed station and the other fixed channel is dedicated for channel-request signals sent out by calling mobile radiotelephone sets, means in the fixed station for transmitting the carrier of the first said fixed channel when there is an originating call for a mobile station and means in each mobile station for transmitting the carrier of the second fixed channel when the mobile set makes an originating call, a calling mobile set including means for first tuning from the first said fixed channel to the second fixed channel for sending its channel-request signal and then tuning to the channel marked with the offer tone for signalling and operation as provided for the originating calls.

4. A system according to claim 3 in which the fixed station includes means for transmitting a carrier signal marked with an answer tone on a free channel, after an originating call, for being seized by the called set, and the fixed station includes means for transmitting a carrier marked with the offer tone on another free channel after a channel-request, for being taken by the calling set.

* * * * *